July 21, 1931.  F. L. JACQMEIN  1,815,568
FLY BOX
Filed Dec. 11, 1929
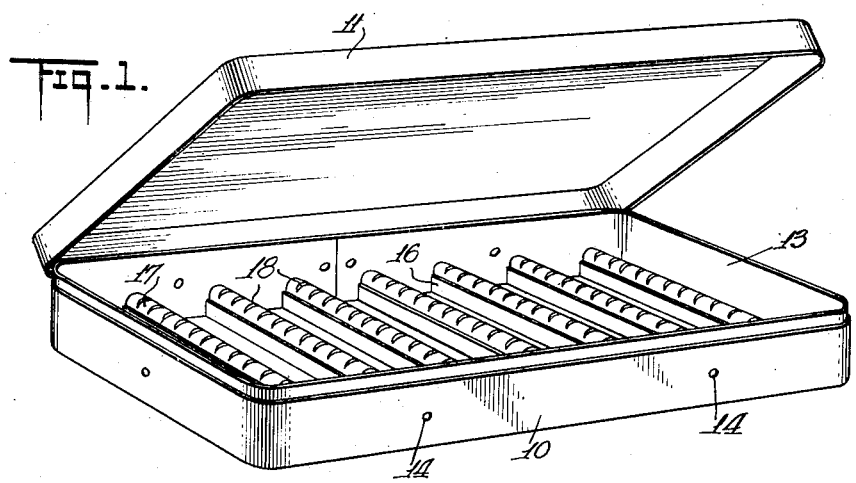
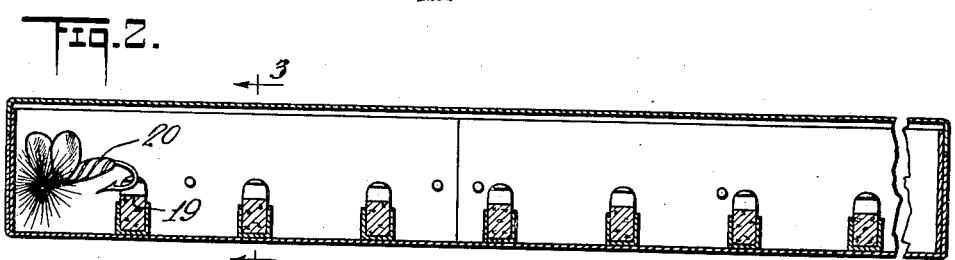
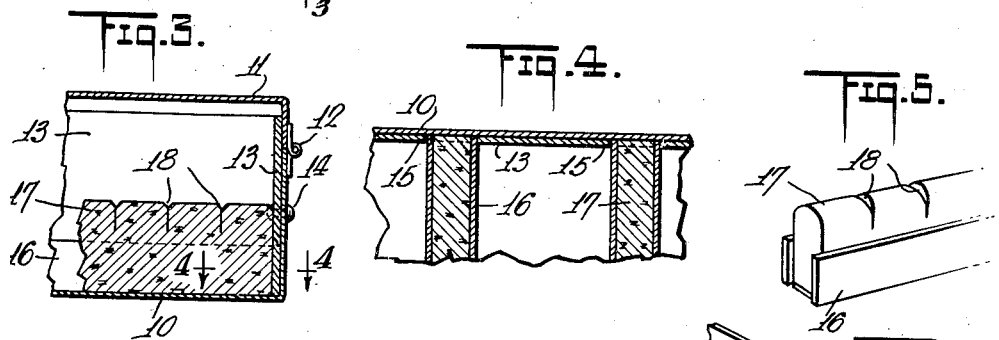
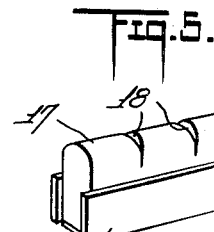
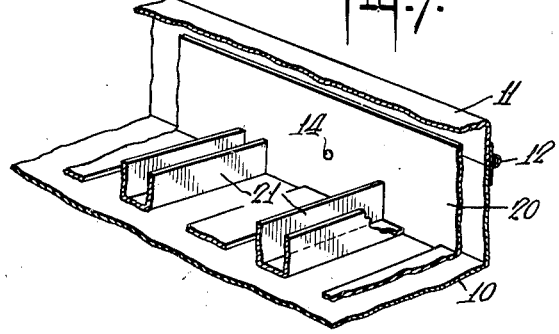
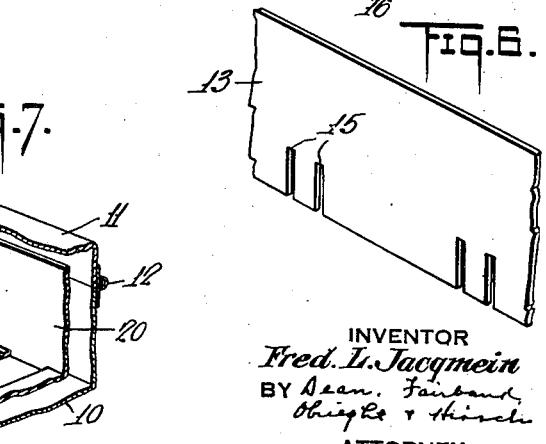
INVENTOR
Fred. L. Jacqmein
BY
ATTORNEYs Patented July 21, 1931

1,815,568

UNITED STATES PATENT OFFICE

FRED L. JACQMEIN, OF MONROE, NEW YORK

FLY BOX

Application filed December 11, 1929. Serial No. 413,156.

The device of the present invention, while capable of various uses, is primarily intended to serve as a conveniently portable container for artificial bait, such for instance as flies.

An object of the invention is to provide a compact fly box which will permit a large assortment of flies to be stored in a relatively small space in such a manner that each individual fly is readily accessible and there is little danger of entangling them even though the box be carelessly handled in transport.

Other objects are to provide a fly box which effectively secures all of the hooks in a thoroughly protected manner so that the possibility of impaling the fingers on a hook when removing a fly from the box is reduced to a minimum.

Still other objects are to provide a device of this character which will be simple and practical in construction, neat and attractive in appearance, rugged and durable in use and well suited to meet the requirements of economical manufacture.

With the above noted and other objects in view the invention consists in certain novel features of construction and combinations and arrangements of parts as will be more fully hereinafter described and pointed out in the claims.

The invention may be more fully understood from the following description in connection with the accompanying drawings, wherein:

Fig. 1 is a perspective view of a fly box embodying the invention, the cover of the box being partially raised to expose the interior.

Fig. 2 is a longitudinal sectional view through the box.

Fig. 3 is an enlarged transverse sectional detail on the line 3—3 of Fig. 2.

Fig. 4 is a sectional detail on the line 4—4 of Fig. 3.

Fig. 5 is a fragmentary perspective of the trough and cork unit.

Fig. 6 is a fragmentary perspective view of the liner showing the manner in which it is notched to accommodate the ends of the channel pieces, and Fig. 7 is a fragmentary perspective of a slightly modified form of the box.

Referring with particularity to the drawings, I have used the reference numeral 10 to designate a shallow box to which a flanged cover 11 is secured by conventional hinges 12. The edge of the cover flange abuts the upper edge of the box proper so that the flange and box body lie flush. Any suitable cover latching means (not shown) may be employed.

The upstanding walls of the box are lined throughout by liner plates 13 of somewhat greater height than the box walls so that they project thereabove, fit within the cover flange, and provide a means for centering the cover as it is swung to closed position.

While I do not wish to limit myself in this respect I preferably form both the box and its cover of light gauge metal. The liner is also of metal and is preferably riveted to the walls of the box as at 14. The liner may comprise thin metal strip stock and may be composed of any desired number of sections. In the present instance I have shown the liner as comprising a pair of generally U shaped members with their legs in terminally abutting relationship.

The edges of the liner which lie against the bottom of the box are provided with notches 15 receiving and retaining the ends of metal channel members 16 with their channels facing upwardly and receiving strips of cork or equivalent material 17. The cork projects above the channelled holding members and is preferably formed with a row of notches 18 to receive the bends of the hooks 19 of the flies 20 which are stored in the box.

Preferably the channel pieces are compressed after inserting their ends into the notches 15 and after the cork strips have been inserted whereby the channel flanges are caused to snugly grip the cork strips which they carry.

A feature of the invention is the fact that the channel pieces and the cork strips are automatically securely assembled relatively to each other and to the rest of the structure simply as an incident of manufacturing the box and without the need of any securing devices whatever.

In practice, prior to the introduction of the liner into the box, the cork strips are laid in the channels 16 and the ends of these channels are introduced into the notches 15 and subsequently slightly compressed and caused to grip the cork. The liner with its assembled cross members is then emplaced in the box and riveted, welded or otherwise permanently or removably secured in position.

As best seen in Fig. 2 the top of the box is spaced far enough above the cork cross pieces to provide adequate clearance for the artificial bait to be stored. There is no danger of injuring the flies as the cover is swung to and since the barbed hooks are lowermost when the hook bends are engaged in the notches 18 of cork strips 17 there is no danger of an angler injuring his fingers when removing the desired bait from the box.

In Fig. 7 there is illustrated a slight modification in which the liner member 30 is itself of box like formation and pairs of integral cross rails 21 struck upwardly from the bottom of the liner define the necessary channels or holders for the cork strips.

It will thus be seen that there is herein described an article in which the several features of this invention are embodied, and which in service attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

Having thus described my invention, what I claim as new and desire to secure by Letters Patent is as follows:

1. A device of the class described including a box, a cover, a liner fitting within and following the contour of the box, and transverse support members held in position by the liner.

2. A device of the class described including a box, a cover, a liner for the box, and transverse support members held in position by the liner, said members including strips of cork or the like shaped to receive and support the hook portions of artificial flies stored in the box.

3. A device of the class described including a box, a cover, a liner for the box, and transverse support members held in position by the liner, the liner being rigidly fixed within the box and projecting above the walls thereof to fit within the flange of the cover.

4. A device of the class described including a box, a cover, a liner for the box, and transverse support members held in position by the liner, said support members comprising channel members and strips of cork or the like held therein and projecting therebeyond.

5. A fly box including a box portion and a cover, a liner shell fitting within the box portion a plurality of fly supporting cross members and means integral with the liner for holding said members in position.

6. A fly box including a box portion and a cover, a liner within the box portion a plurality of fly supporting cross members and means integral with the liner for holding said members in position, said means comprising notches in the lower edges of the liner.

7. A fly box including a box portion and a cover, a liner within the box portion a plurality of fly supporting cross members and means integral with the liner for holding said members in position, said means comprising notches in the lower edges of the liner, the support members comprising channel pieces and cork strips therein, the channel pieces being compressed as an incident whereby they grip the cork strips.

8. A fly box including a box portion and a cover, a liner within the box portion a plurality of fly supporting cross members and means integral with the liner for holding said members in position, said means comprising notches in the lower edges of the liner, the support members comprising channel pieces and cork strips therein, the channel pieces being slightly compressed whereby they grip the cork strips, the strips projecting beyond the channel pieces and being notched to receive the hooks of flies to be supported.

9. A fly box including a box portion and a cover, a liner within the box portion a plurality of fly supporting cross members and means integral with the liner for holding said members in position, said means comprising notches in the lower edges of the liner, the support members comprising channel pieces and cork strips therein, the channel pieces being slightly compressed whereby they grip the cork strips, the strips projecting beyond the channel pieces and being notched to receive the hooks of flies to be supported, the liner being fixed within the box and including projecting upper edges to center the flanged box cover.

10. A fly box including a box portion and cover, a liner fitting the box, pairs of rails struck upwardly from the bottom of liner and fly carrying cork strips held between the rails.

Signed at Monroe in the county of Orange and State of New York this 9th day of December A. D. 1929.

FRED L. JACQMEIN.